United States Patent [19]

Cislak

[11] 4,124,175

[45] Nov. 7, 1978

[54] RETRACTOR WITH TENSION RELIEVING MECHANISM

[75] Inventor: Raymond S. Cislak, Chicago Heights, Ill.

[73] Assignee: Gateway Industries, Inc., Chicago, Ill.

[21] Appl. No.: 805,313

[22] Filed: Jun. 10, 1977

[51] Int. Cl.$^2$ .................... A62B 35/02; B65H 75/48
[52] U.S. Cl. .............................................. 242/107.7
[58] Field of Search ... 242/107.7, 107.6, 107.4 R–107.4 E; 297/388; 280/744–747

[56] References Cited

U.S. PATENT DOCUMENTS

| | | | |
|---|---|---|---|
| 2,577,553 | 12/1951 | White | 242/107.7 |
| 3,682,412 | 8/1972 | Kuszynski | 242/107.6 X |
| 4,023,746 | 5/1977 | Magyar | 242/107.7 |

Primary Examiner—Harvey C. Hornsby
Assistant Examiner—John M. Jillions

Attorney, Agent, or Firm—Fitch, Even, Tabin & Luedeka

[57] ABSTRACT

A retractor is provided with a tension relieving mechanism which is operated by a belt sensor for sensing a taut or slack condition of the belt. The belt sensor operates a blocking means between a blocking position in which the tension of the winding spring is relieved from the protracted belt on the passenger's shoulder and a release position in which the spring winding force is applied to the belt to rewind the belt. Preferably, a cam means is provided to hold the blocking means in its release position to rewind slack occasioned during slight forward protraction movements of the passenger when the belt has been initially set in the tension relieving state. In the preferred embodiment of the invention, the tension relieving mechanism is set into the tensionless condition immediately upon buckling of the belt tongue plate to a buckle. The amount of slack in the protracted belt cannot be increased by ratcheting past the teeth as with prior art tension relieving mechanisms.

12 Claims, 10 Drawing Figures

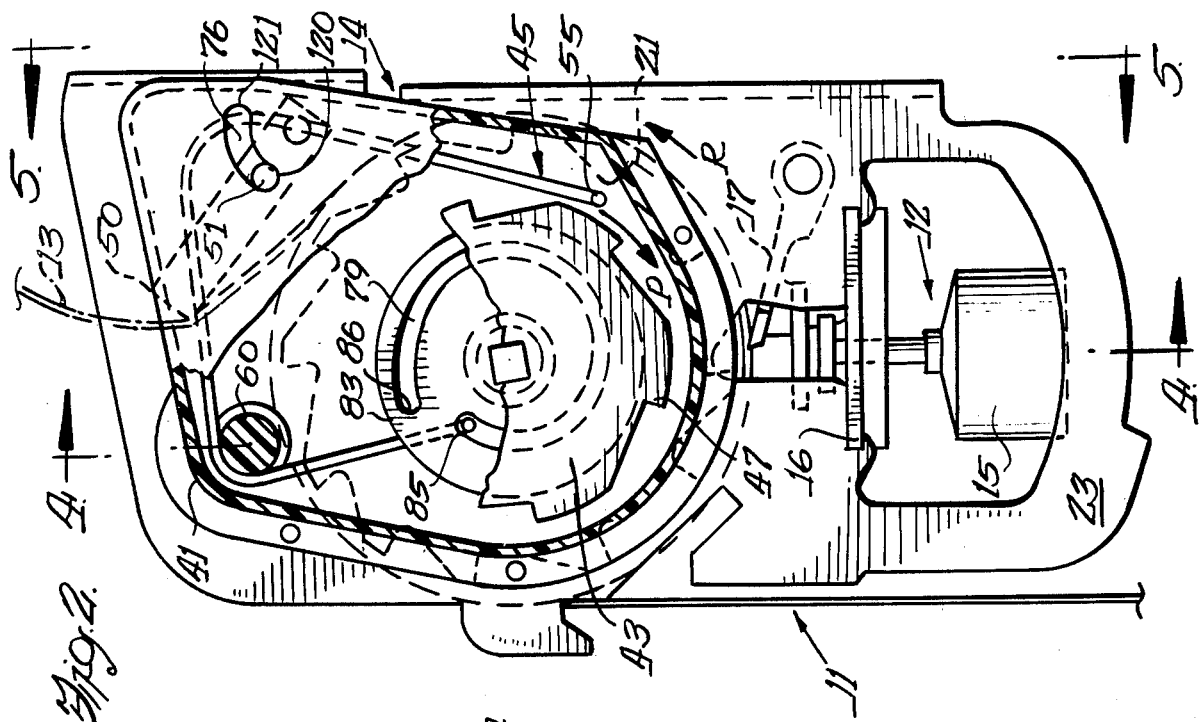
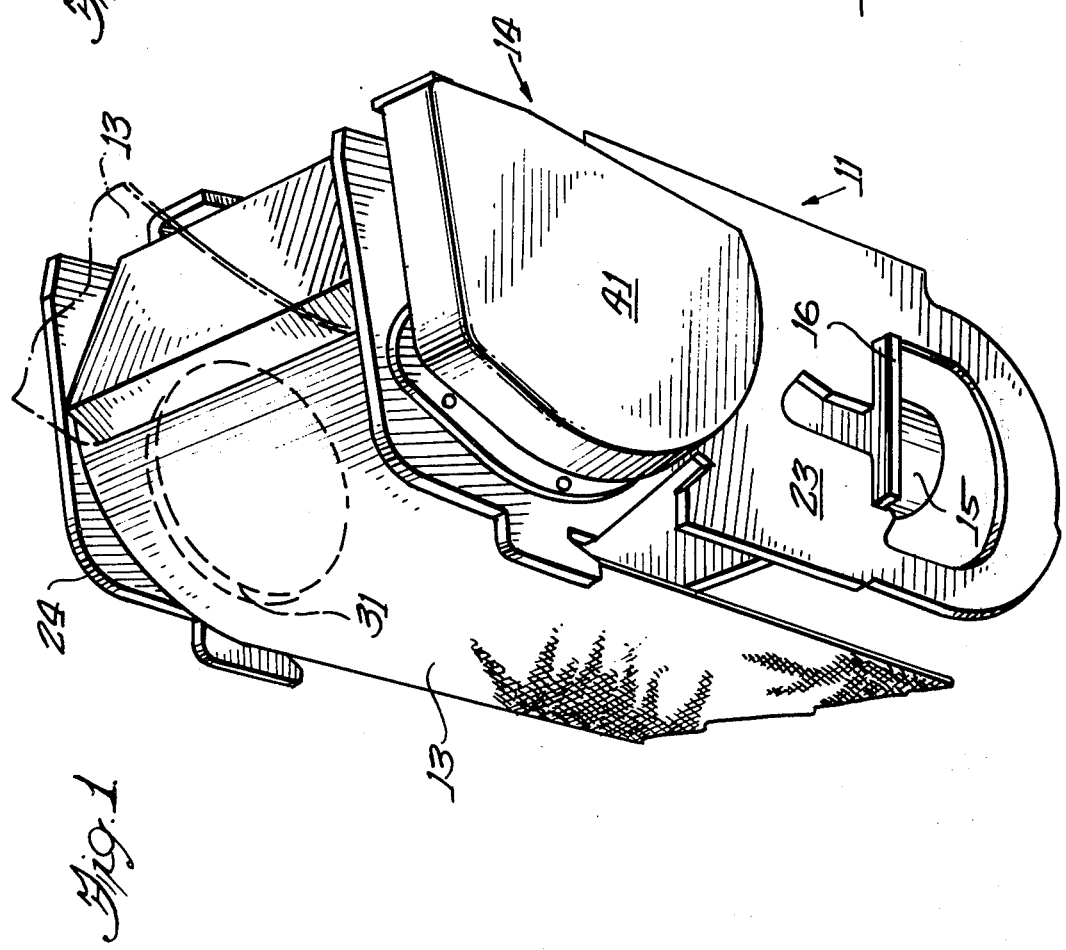

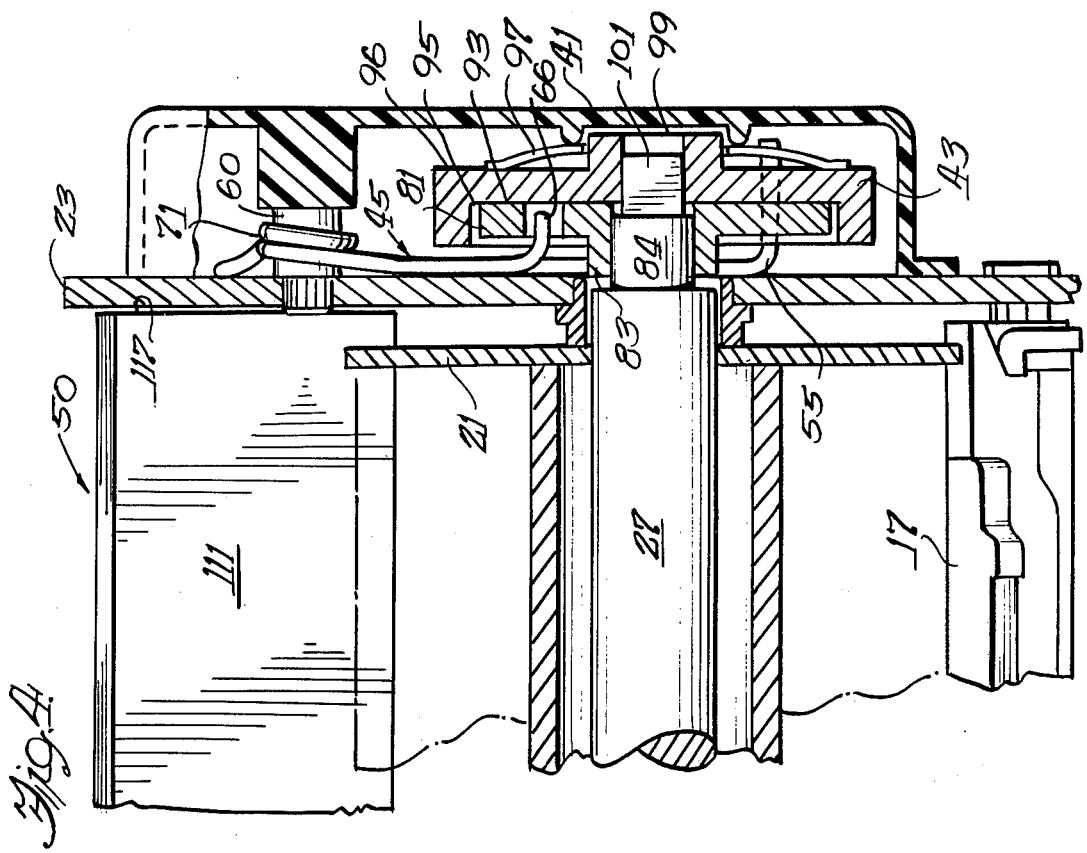
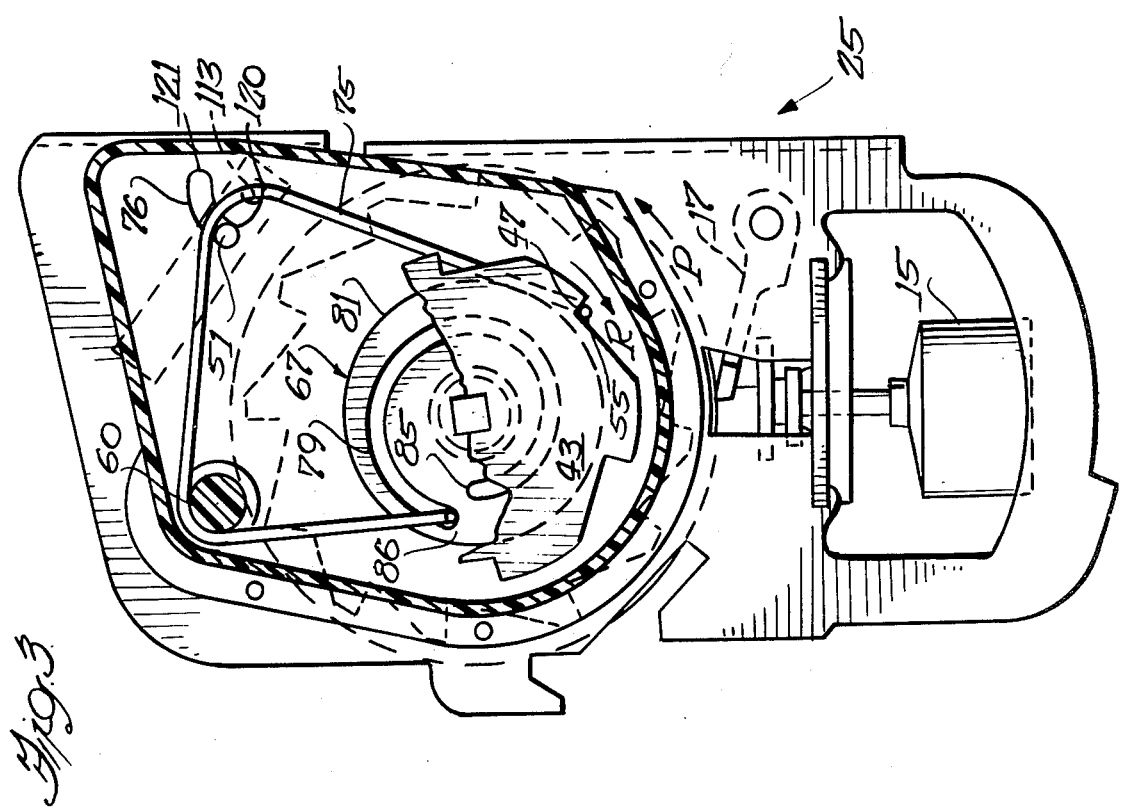

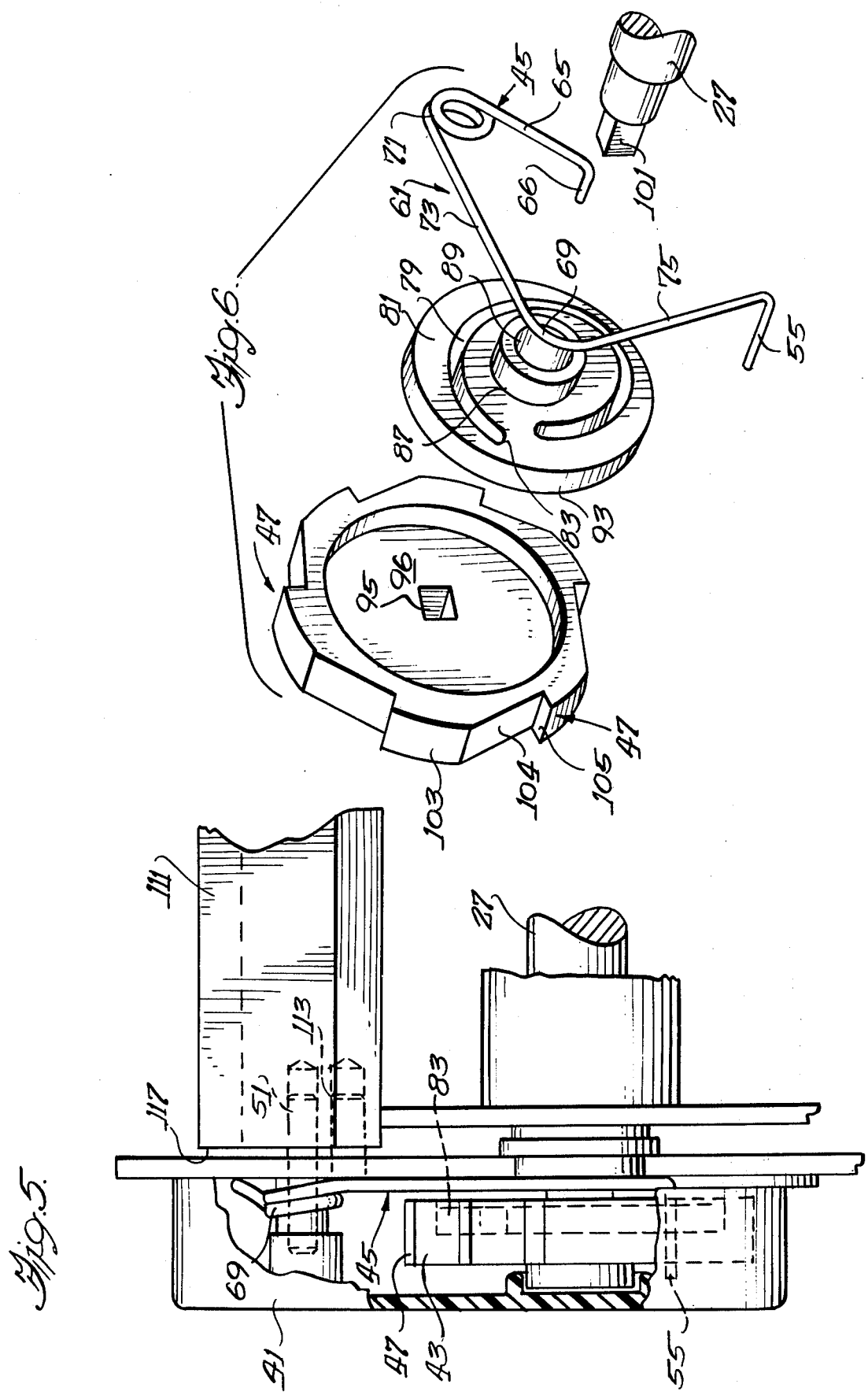

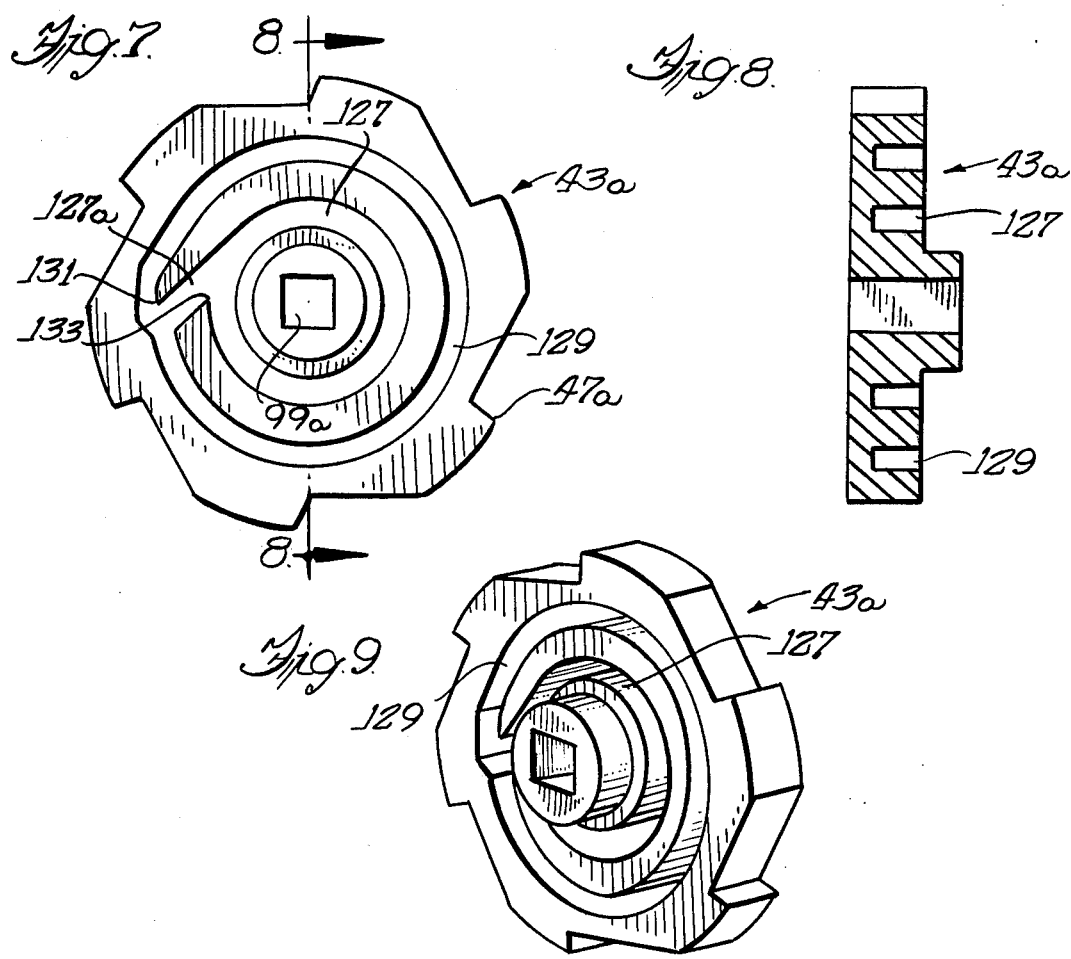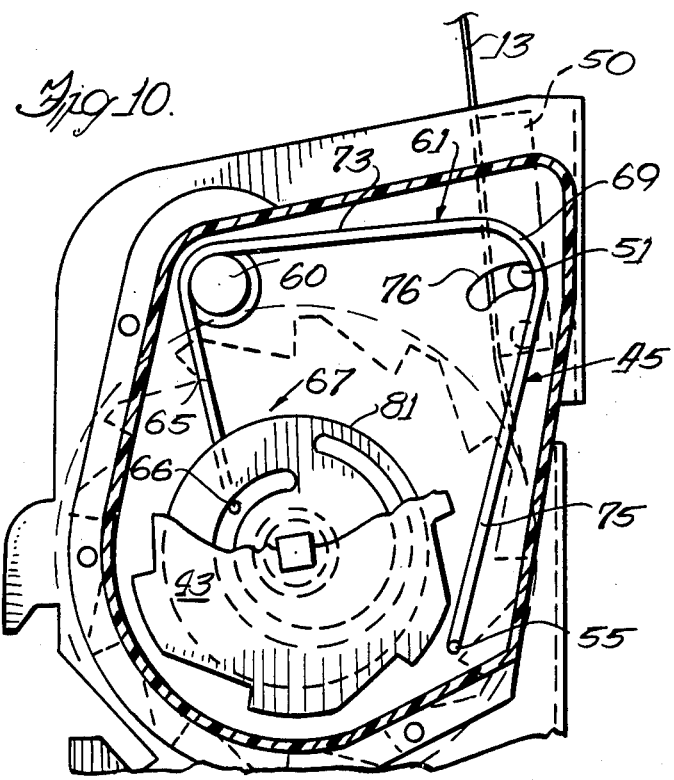

RETRACTOR WITH TENSION RELIEVING MECHANISM

This invention relates to a retractor and more particularly to a seat belt retractor having a mechanism for relieving the seat belt engaging the passenger's body from the tension of the winding spring of the retractor.

The invention is directed to a so-called "tensionless" retractor in which at least the shoulder belt on the shoulder of the passenger is relieved of the tension force of the retractor winding spring to afford greater comfort to the vehicle passenger. The need for such relief of the belt pressing on the passenger's shoulder is more pronounced in single loop retractors. In such retractors, more powerful winding springs are used to rewind the single loop seat belts which have a slipping or sliding connection with a tongue plate carried thereon. The winding spring is effective to adjust the length of the lap belt portion as well as the length of the shoulder belt portion to the anatomy of the occupant by pulling and sliding the lap belt thrugh the sliding connection with the plate and rewinding any excess shoulder belt portion after the passenger has latched the tongue plate to the buckle. Inthese single belt loop systems the floor retractor which adjusted the length lap belt portion has been eliminated.

A number of proposals have been made to provide retractors with tensionless mechanisms which will lock the extended belt to relieve the extended belt of the tension of the winding spring leaving a slackened or tensionless belt on the shoulder of the wearer. Most typically, these tension eliminator mechanisms have been of the so-called "window shade" type having a pair of frictionally driven disks which control the movement of a detent into and from engagement with a small plastic detent wheel secured to the end of the reel shaft on the side of the reel opposite the winding spring. The tension relieving detent and detent wheel are in addition to the usual inertia operated lock bar which cooperates with a pair of steel ratchet wheels at opposite ends of the reel and which take the heavy load at the time of an accident. Typically, devices proposed having a pair of disks are shown in U.S. Pat. Nos. 3,851,836, 3,869,098 and 3,834,646.

Another proposal for a belt tension eliminator is disclosed in U.S. Pat. No. 4,002,111 in which an elongated spring wire is anchored to the retractor frame and has a hooked free end mounted for movement within three annular tracks formed in a disk attached to the reel shaft. Within one of the three tracks are formed ratchet teeth stops which are selectively engaged by the hooked end of the spring wire to prevent further belt retraction of the belt after initial belt protraction thereby leaving the protracted belt tensionless. A still further tensionless mechanism for an inertia retractor is disclosed in Bryll U.S. Pat. No. 3,917,189.

Most of the above-described retractors do not automatically assume the tensionless state after the belt has been initially protracted and then released for a slight retraction during buckling of the latch plate to the buckle. To set the tension relieving mechanism the occupant exerts a slight further protraction of the belt as by shrugging his shoulders forwardly. The tension mechanism is thus set with the belt held in this tensionless state at a predetermined protracted length. Typically, these tension eliminator mechanisms have a so-called "comfort zone" which allows a slight protraction, for example, up to 4 inches, without releasing the tension eliminator mechanism. Thus, the belted passenger may make slight forward movements as operating radio controls, cigarette lighters or other devices on the dashboard of the vehicle without unconsciously releasing the tension eliminator mechanism. Also, for slight protractions of 4 inches or less, the tension relieving mechanism allows the retracting spring to rewind the protracted belt and to return the belt to its original length before automatically becoming operative to again lock the reel against rewinding and thereby leaving the protracted belt in its slackened condition. These tension eliminator mechanisms are released by a protraction of the belt beyond the comfort zone protraction length, e.g., a protraction of 5 inches or more and this is usually accomplished as a result of a conscious and deliberate act on the part of the belted occupant. Once the tension eliminator device is disabled and the belt buckle is unlatched, the belt will be automatically retracted to its fully wound position allowing the occupant to leave the vehicle with the belt in its stowed position. Commercially avaialble tensionless retractors of the window shade type have a pair of disks having aligned notches which expose about five or six teeth on the detent wheel to the detent pawl. When the tension relieving mechanism is initially set into its locking state, the detent pawl engages one of these five or six teeth. It is then possible for the occupant to shift slightly and protract the belt and cause the exposed ratchet teeth to ratchet past the detent pawl to establish additional slack in the protracted belt. The pair of disks are ineffective in such a case to cause belt rewind to the original set length and there has thus been established a new set belt length having some undesirable slack therein.

In accordance with the present invention, the problem of ratcheting over exposed teeth and creating slack in the tensionless belt in the window shade type of tensionless mechanisms has been eliminated. Also, the tension eliminator mechanism may be constructed to set automatically into tensionless state upon buckling of the latch plate to buckle. Thus, it is possible to eliminate the need for the occupant to protract the belt slightly and usually deliberately in order to set the retractor into the tensionless state as in prior art tensionless retractors. The retractor may thus be made simpler to operate and simpler to comprehend.

The retractor of the preferred embodiment of this invention provides a comfort zone which rewinds the further belt protraction of a set length or less of, e.g., 4 inches, to initial slackened length and automatically holds the belt tensionless again. Upon a significant protraction of the belt beyond that of the comfort zone protraction length, the tension relieving mechanism is disabled and the winding spring is free to rewind the belt onto the retractor reel.

In accordance with the present invention, the pair of friction disks of the window shade type used to control the tension eliminator mechanisms are not used. Instead, in the preferred embodiment of the invention illustrated herein, a sensor for belt tension and a cam means are used to operate selectively the tension eliminator mechanism between its tensionless state and its released state in which the winding spring urges the protracted belt to rewind.

Accordingly, a general objec of the invention is to provide a new and improved tension eliminator device in a retractor.

A more specific object of the invention is to provide an improved retractor in which the tension of the extended belt is sensed and used to control a detenting mechanism for relieving a protracted belt of tension of the winding spring.

These and other objects of the invention will become apparent when taken in connection with the accompanying drawings in which:

FIG. 1 is a perspective view of a retractor embodying the preferred embodiment of the invention.

FIG. 2 is a side elevational view of the retractor in FIG. 1 with a cover for a tension relieving retractor mechanism being broken away.

FIG. 3 is a view similar to FIG. 2 showing the tension relieving mechanism in its actuated position.

FIG. 4 is a sectional view taken substantially along the line 4—4 in FIG. 2.

FIG. 5 is a view taken substantially along the line 5—5 of FIG. 2 with a portion of the cover broken away.

FIG. 6 is an enlarged exploded view of a ratchet wheel and cam means for operating a detent member.

FIG. 7 is an elevational view of a ratchet wheel and cam means constructed in accordance with a further embodiment of the invention.

FIG. 8 is a cross-sectional view taken substantially along the line 8—8 of FIG. 7.

FIG. 9 is a perspective view of the ratchet wheel and cam means of FIG. 7; and

FIG. 10 is a cross-sectional view showing the belt sensor holding the detent member in its release position.

As shown in the drawings for purposes of illustration, the invention is embodied in the seat belt retractor 11 having an emergent inertia operating locking means 12 for locking aganst belt protraction at the time of an accident and a tension eliminator means or mechanism 14 selectively operable to lock a seat belt 13 against retraction thereby relieving the passenger of a tensioned belt on his shoulder and torso. The emergency inertia locking means 12 herein comprises a pendulum weight 15 mounted on a support bar 16 for swinging movement to operate a locking bar 17 into locking engagement with a pair of toothed ratchet wheels 21 mounted adjacent opposite side flange 23 and 24 of a retractor frame 25. The ratchet wheels are made of steel and are fixed to the reel shaft 27 whichis journaled in the side frame 23 and 24. A spirally-wound clock-like spring 31 is attached to the reel shaft 27 to wind the seat belt 13, the spring being mounted within a protective cover attached to the side frame 24. Preferably, the tension eliminator mechanism 14 is mounted at the opposite side of reel shaft 27 and also is covered by a housing cover 41 secured to the side frame 23.

The preferred tension eliminating mechanism 14 comprises a blocking member preferably in the form of a small plastic ratchet wheel 43 fixed to the reel shaft 27 and further comprises a blocking means or member preferably in the form of a detent member 45 movable into a locking or blocking position in which the detent member is in engagement with one of the stops or ratchet teeth 47 on the ratchet wheel 43.

In accordance with the present invention, the tension eliminator mechanism 14 is selectively operable by a belt sensing means including a belt sensor 50 which engages the belt and is shifted by the belt as it is tensioned or as the belt is allowed to go slack. The belt sensor 50 preferably includes an actuating means in the form of an actuating pin 51 which shifts the detent member 45 from its locking or blocking position as shown in FIG. 3 to its release position, shown in FIG. 10, in which a stop in the form of hook end 55 on the detent member is located radially outwardly of the path of the turning ratchet teeth 47 on the ratchet wheel 43.

When the belt is fully wound on the reel and is initially pulled by the passenger, the belt 13 will hold the belt sensing member 50 in its actuating position in which the actuating pin 51 on the belt sensor holds the detent 55 in the release position clear of the ratchet, as best seen in FIG.10. During the act of buckling the tongue plate to the buckle, there is a slight retraction of the belt and a lessening of tension in the belt and the belt sensor 50 pivots to its low belt tension position allowing the detent member 45 to pivot into the blocking position to automatically lock the belt in the tensionless state, as best seen in FIG. 3. In this preferred embodment of the invention, the tension relieving mechanism is effective to relieve the belt of the winding spring force without any additional, second protraction of the belt as required by the window shade type of tension eliminator mechanisms used heretofore.

In addition to the belt sensor, the preferred tension relieving mechanism 14 also employs a cam means 67 which also controls the position of the detent member 45. As will be explained in greater detail, the cam means assures the rewind of the slack made in the belt by the occupant who leans forward and protracts additional but limited belt. More specifically, the cam means will hold the detent member 45 from locking with one of the subsequent teeth on the ratchet wheel during a slight protraction and allows the detent member 45 to swing to re-engage the same tooth so that additional slack is not built into the tensionless belt during slight movements as with the window shade kind of retractor in which the ratchet dog may ratchet over an exposed tooth. The cam means also is effective to hold the detent member 45 in its release position when the belt 13 is protracted beyond a predetermined length and then released for full rewind onto the reel.

Herein, the detent member 45 is made inexpensively from a piece of bent spring wire and provides multiple functions including that of acting as a spring to bias the sensing member 50 to its low belt tension position. The illustrated detent member is in the form of a bent hair-shaped spring having a central curved portion pivotally mounted about a pin 60, as best seen in FIG.4, secured to the retractor side frame 23. Preferably, the detent member 45 has a first bent, angle-shaped leg 61 with the actuating pin 51 engaging the leg 61 adjacent to the bend 69 therein. A second or cam-controlled leg 65 on the detent member 45 has a cam follower end 66 which cooperates with a cam means 67 driven by the reel to hold the detent member in the release position during rewind of the slight belt extension occurring during movement of the passenger forwardly after the belt is in the tensionless state. The rewind of this belt extension is important to keep the belt positioned closely adjacent to and on the torso so that the occupant will not move to take up a larger amount of slack before the belt held by the inertia locking means 12 becomes effective.

Referring now in greater detail to the illustrated embodiment of the invention and more particularly to FIG.6, the detent member 45 is a spring wire form having its central curve portion formed with a pair of looped coils 71 encircling the pin 60. By way of example only, the bent leg 61 of the detent member has a first or upper section 73 extending from one of the coils to the central bend 69 from which extends downwardly a section 75 of the bent leg. The downwardly extending leg carries the stop or hook end 55. Herein, the preferred angle between the leg sections 73 and 75 is about 68° and the angle between the leg section 73 and the cam-controlled leg 65 is about 55°. The hook end 55 is bent at right angles outwardly at the end of the leg section 75 and extends generally perpendicularly and outwardly from the retractor side frame plate 23 which is adjacent thereto. In its detenting position, as best seen in FIG. 3, the ratchet tooth 47 engaging the hook end 55 pulls the hook downwardly and acts through the actuating pin 51 to pull the sensing member 50 downwardly to the bottom of a slot 76 in the retractor side frame 23, thereby limiting a turning of the detent member 45 in the clockwise direction, as seen in FIG. 3.

The cam-controlled leg 65 of the detent member is likewise formed with hook-shaped cam follower end 66, as best seen in FIG. 6, projecting at right angles to the leg 65 and extending outwardly and perpendicular to the retractor side frame 23 for projecting into engagement with the cam means 67. The preferred cam means 67 is in the form of a slotted groove 79 of arcuate shape cut in a fact of a control member 81 associated with the ratchet wheel 43. In the first embodiment of the invention, the arcuate cam slot 79 extends approximately 360° and the central member 81 is a circular disk 83 which is frictionally clutched to the ratchet wheel 43 to turn in the direction of the ratchet wheel rotation through about 360° of travel at which time the hook end 66 of the detent member 45 abuts an end of the cam slot and holds the disk 83 against further turning movement while the ratchet wheel slides relative thereto. For instance, from the tensionless position a belt protraction turns the disk 83 and the cam groove 79 in the counterclockwise direction as viewed in FIG. 3, and the cam means forces the cam follower end 66 radially inwardly and into abutment with end 85 of the cam slot 79 and, in this position, the cam means holds the detent 55 in its release position (FIG. 2) outwardly of the path of the ratchet wheel teeth 47 so that the extension of the belt is taken up when the ratchet wheel 43 turns in a clockwise direction. On the other hand, when the occupant moves backwardly in his seat, the belt is rewound slightly and the cam disk 83 will turn with the ratchet wheel causing the cam follower end 66 to move radially outwardly along the cam slot 79 simultaneously swinging the other detent leg to bring the detent hook 55 into position to engage a ratchet tooth 47 to again render the extended belt about the passenger tensionless (FIG. 3). It is to be understood that the control of the detent hook 55 by the cam follower leg 65 may be overridden by the actuating pin 51 of the belt sensor 50 which may flex the detent leg 61 and hold the detent hook 55 in its release position thereby allowing the winding spring to wind the belt to take up any slack in the extended belt.

The preferred cam control disk 83 has a central cylindrical hub 87 with an internal bore 89 mounting the same on a shouldered extension 88 (FIG. 4) of the reel shaft 27. A large diameter outer flat face 93 of the disk 83 abuts an inner face 95 of the ratchet wheel 43 to provide the frictional coupling therebetween. A Belleville washer shaped spring 97 (FIG. 4) is positioned between an outer side 96 of the ratchet wheel 43 and the facing side of the cover 41 and is compressed therebetween to assure the frictional clutch coupling between the ratchet whee and the control cam disk 81. For the purpose of fixing the ratchet wheel 43 to the reel, the preferred ratchet wheel 43 has a square-shaped central bore 99 (FIG. 6) into which is projected a square cross-sectioned end 101 of the reel shaft extension. The preferred ratchet teeth 47 are found on the outer periphery of the ratchet wheel and have outer rounded surfaces 103 and inclined surfaces 104 which guide the detent hook 55 downwardly and inwardly to abut a radially extending shoulder wall 105.

The belt sensing means 50 may take various shapes and forms but herein is in the form of a rectangularly-shaped bar 111 preferably formed of plastic and mounted for pivotal movement about an axis at its lower end through a pair of pivot pins 113 (FIGS. 4 and 5) projecting into bores in the bar 111 and secured at the outer ends to the retractor side frames 23 and 24. The single actuating pin 51 is disposed slightly above the axis of the pivot pins 113 for turning in an arcuate path about the axis. The illustrated actuating pin 51 is secured in a bore formed in the end face 117 of the bar 111 and projects through an arcuate slot 76 formed in the side frame 23. Opposite ends 120 and 121 of the slot 76 define the limits of the pivotal movement for the belt sensing bar 111. When the belt is slack and loose, the weight of the bar 111 is sufficient to allow it to pivot the belt downwardly with the actuating pin 51 abutting the lower cam slot end 120. On the other hand, when the belt is pulled by the passenger, the sensing bar 111 pivots upwardly thereby flexing and pivoting the detent leg section 75 of the detent member 45 to the release position shown in FIG. 10.

In the above-described embodiment of the embodiment, the control cam means was on a cam disk 83 which was frictionally clutched to the ratchet wheel 43 for limited turning movement. A spring 97 is also used to assure the frictional clutching between the ratchet wheel and cam control disk.

In accordance with the further embodiment of the invention, shown in FIGS. 7, 8 and 9, the separate cam control disk 83 and the spring 97 have been eliminated with the cam control means 67 being formed on the inner face 125 of a ratchet wheel 43a. The preferred cam means includes an inner and outer cam slot 127 and 129 into which is projected the cam follower end 66 of the detent member 45. The inner cam track 127 is substantially a circular groove coaxial with the axis through a square-shaped bore 99a end in which the cam follower end 66 of the detent member 45 is positioned. When the cam follower end 66 is in the outer cam slot 129, the detent stop 55 will be pulled radially inwardly to the locking position to engage a ratchet tooth 47. When the cam follower end 66 is in the inner cam slot 127, the detent stop 55 will be positioned radially outwardly of the ratchet teeth 47. During initial protraction of the fully wound web, the cam follower 66 will be in the inner cam slot as the ratchet wheel 43a turns in the clockwise direction as seen in FIG. 7. When the belt is initally protracted from its fully wound position and brought about the occupant's waist, a slight retraction end moving to abut an inner pointed end wall 133 will about the cam follower 66 and force the same into the outer cam slot 129 allowing the detent stop 55 to pivot radially inwardly to engage a ratchet tooth 47A and to thereby relieve the protracted belt of the winding spring force. For small protractions, the cam follower merely stays in the outer slot 129. On the other hand, when the belt is being protracted causing about a full revolution of the detent member, the outer pointed cam surface 131 abuts the follower end 66 and forces the same radially inward into the inner cam slot 127 in which it will stay during belt retraction.

As an aid to a better understanding of the invention, a brief description of the operation thereof will now be given. hen the passenger grasps the tongue plate and pulls it across his body toward the buckle, the belt 13 is tensioned and pivots the belt sensor 50 to its actuating position at which its actuating means or pin 51 abuts the detent leg section 75 and pivots the detent end 55 outwardly of the path of the ratchet teeth 47 on the ratchet wheel 43, as best seen in FIG. 10. The taut belt during this initial protraction keeps the detent member outwardly of the ratchet wheel teeth 47 to prevent any clicking noise of the detent member snapping against the teeth passing the detent end 55. During buckling of the belt latch plate to a buckle (not shown), the rewind spring is active to rewind the belt and bring it more tightly against the torso of the passenger. During rewind following the initial protraction, the belt sensor 50 pivots downwardly carrying its actuating pin 51 to engage the bottom end 120 of the slot 76 and likewise the cam control disk 81 turns with the reel to the position shown in FIG. 3 in which its follower end 66 is radially inwardly abutting the end 86 of the cam slot 79 holding the cam disk 83 to its limit of turning in the clockwise, rewind direction, as seen in FIG. 3. At this position, the belt winding spring tension is relieved from the protracted belt about the passenger's body. This occurs without the passenger having to exert a protraction on the belt as in prior art retractors.

Usually, there occurs a slight protraction of the belt as when operating the controls of the vehicle. More specifically, as the occupant moves forward slightly, any slack is taken up and the belt becomes taut with the belt pivoting the belt sensing member 50 upwardly and acting through its actuating pin 51 to pivot the detent end 55 outwardly of the ratchet teeth 47 (FIG. 10). Simultaneously, the cam control disk 81 is turned in a counterclockwise direction, as viewed in FIG. 3. For very slight forward and return movements, the detent member 55 always returns to the same tooth 47 and no additional slack is created in the protracted belt as with the prior art window shade devices in which the dog ratchets over one ratchet wheel tooth to engage the next ratchet wheel tooth. For lower protractions of less than 360°, the cam follower end 66 is moved radially inwardly as it is positioned closer to the other end 85 of the cam slot 67 at which the cam disk 81 is now effective to hold detent stop 55 from the ratchet wheel, as best seen in FIG. 2. When the passenger shifts backwardly, the reel automatically rewinds the belt thereon with the cam disk 83 turning with the reel in the rewind direction (clockwise as viewed in FIG. 2) and with the cam follower end moving radially out and simultaneously swinging the detent stop 55 inwardly. The cam disk returns the detent stop 55 to engage the same tooth it originally engaged to assure no build-up of slack in the protracted belt. The belt is again held tensionless by the detent member engaging the ratchet wheel 43.

To release the tension relieving mechanism and to assure a complete rewind of the protracted belt, the occupant need merely exert a continuous tension on the belt 13 to swing the belt sensor 50 to its actuating position in which it holds the detent member 45 in its release position outside of the path of movement of the ratchet teeth 47. A release of the belt 13 allows the continued rewind as the cam control slot is now in position to hold the detent member outwardly of the ratchet teeth. This condition continues until the belt is freely rewound.

In the embodiment of the invention shown in FIGS. 7, 8 and 9, the operation of the belt sensor 50 is the same. The inner and outer cam control tracks 127 and 129 control the follower end 66 of the detent member. During initial belt protraction from the fully wound condition, the cam follower end 66 will be in the inner cam track 127 with the ratchet wheel 43a turning in a clockwise direction, as viewed in FIG. 7. At the time of latching the tongue plate to the buckle, the rewind spring turns the reel, ratchet wheel 43a and the cam slot 127 in the counterclockwise or retraction direction, as seen in FIG. 7, causing the cam follower end to abut the cam point 133 and to be cammed radially outwardly through the slot section 127a into the outer cam slot 129 which, when accompanied with the downward swinging of the belt sensor 50, assures the pivoting of the detent member 45 into position to engage a ratchet tooth 47 on the ratchet wheel 43a thereby stopping the rewind of the belt and holding the extended belt tensionless. For subsequent limited protractions of the belt less than one revolution of the reel, the detent end 66 stays stationary as the slot 129 turns therepast. However, for greater belt protractions, for example of 360° or more, the detent end 66 will abut the outer cam point 131 and be forced outwardly through the junction passageway section 127a into the inner cam slot 127 which allows rewind of the belt to the fully wound state.

In the illustrated embodiment of the invention, the cam follower end 66 is located at the about 270° position on the cam disk, as illustrated in FIGS. 2 and 3, with the cam follower end 66 shifting generally in a horizontal plane and radially inwardly and outwardly as the cam disk turns. In another embodiment of the invention not illustrated herein, the cam follower end 66 was located at about the 360° position, i.e., at the top of cam disk 83 and the cam follower end 66 shifted in generally upwardly and downwardly directions along a radial line as the cam disk 83 rotated. When the cam follower end 66 moved upwardly and downwardly, the inward and outward positions of the follower end had the reverse effect from that described herein. That is, in this further embodiment of the invention, the cam follower end 66 was at its radially inward position and the detent stop 55 was swung radially inwardly into locking engagement with the ratchet wheel teeth 47 and conversely when the cam follower end 66 was at its radially outward position the detent stop 55 was held in the outer release position free of the ratchet wheel teeth 47. Additionally, in this further embodiment of the invention, the arcuate extent of the cam slot was limited to about 90°. It is to be appreciated that the particular length and shape of the cam means may be varied considerably from that illustrated and still fall within the claims of the present invention.

Additionally, it is within the purview of the present invention to operate the belt sensor type of tension relieving mechanism in the manner of the prior art mechanisms which require a slight protraction after the buckling of the tongue plate to the buckle in order to set the tension relieving mechanism in its locking position. More specifically, in this further embodiment of the invention, which is not illustrated herein, the outer surface of the cam disk 83 is projected circumferentially and radially outwardly of the ratche teeth 47 to engage the detent stop 55 to prevent its radial inward movement to locking engagement with the ratchet teeth 47 after the slight retraction following the buckling up of the tongue plate. A subsequent and slight protraction of the belt rotates the cam disk 83 to bring a notch in the outer cam surface to a position in alignment with the detent stop 55. In this aligned position, the detent stop 55 is free to swing radially inwardly sufficiently to engage the next ratchet tooth 47 on the detent wheel thereby locking the reel and holding the protracted belt on the occupant in a slack condition. In this embodiment, a second slight protraction merely rotated the disk with detent member stop 55 being held out by the outer peripheral surface of the cam disk. When the occupant leans back, the reel rewinds the belt until the notch again is aligned with the detent stop 55 which then swings inwardly to engage the ratchet tooth 45 and hold the belt tensionless. The belt sensor 50 operates to release the belt for rewinding and to rewind the belt to its fully wound state.

From the foregoing, it will be seen that the present invention operat s with belt tension control as well as a simplified cam means which provides the comfort zone. The present invention eliminates the need for the two control cams of the particular window shade type shown in the aforementioned patents. The preferred embodiment of the invention is made of relatively inexpensive and few parts to provide a commercially feasible tension-relieving mechanism.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. In a locking retractor for a seat belt wound upon a rotatable reel urged by a biasing means to wind the belt onto the reel and having a selectively operable locking means for locking the reel against turning for belt protraction, the improvement of a tension relieving mechanism comprising:
   means for blocking the reel against rewinding the protracted belt after initial belt protraction,
   belt sensor means for sensing the tension of the belt and for operating said means for blocking the reel to a release position allowing full rewind of the belt onto the reel, and
   cam means connected to said reel for rotation therewith to a position to operate upon further belt protraction after the initial belt protraction said blocking means to a release position to allow a limit winding of the protracted belt to its initially protracted length.

2. A retractor in accordance with claim 1 in which said cam means comprises a disk frictionally clutched to the reel to turn through a limited extended movement with the reel and having a cam surface thereon for operating said blocking means.

3. A retractor in accordance with claim 1 in which said blocking means comprises a ratchet wheel connected to said reel for rotation therewith and a detent member for engagement with said ratchet wheel to hold said reel against winding rotation, and in which said cam means shifts said detent member into engagement with said ratchet wheel after a slight retraction and without a following belt protraction.

4. A retractor in accordance with claim 3 in which said detent member comprises a spring member having a first portion mounted for pivotal movement, a first end on said spring member for engaging said ratchet wheel and another portion operated by said belt sensor means.

5. A locking retractor for a seat belt comprising: a rotatable reel having a seat belt wound thereon, means for locking said rotatable reel against further belt protraction at the time of an accident, a spring means biasing the reel in a winding direction, detent means selectively movable between a detenting position to block belt winding rotation and movable to a release position allowing belt winding rotation, belt sensor means for engaging the belt and for operation said detent means ot its release position when the belt is taut, and means operable upon further belt protraction after said initial belt protraction to hold said detent means in its release position momentarily to allow the belt reel to rewind the belt to take up the slack therein before said detent again shifts to its blocking position.

6. A locking retractor in accordance with claim 5 in which said means for locking said rotatable reel comprises a lock bar and ratchet wheels engageable by said lock bar to prevent belt protraction and in which said detent means comprises a further ratchet wheel and a detent member engageable therewith to prevent belt retraction.

7. A retractor in accordance with claim 5 in which said belt sensor means for engaging the belt comprises a pivotally mounted member pivoted in a first direction by the belt when the belt is taut and released for movement in an opposite direction when the belt is slack.

8. A retractor in accordance with claim 5 in which said belt sensor means comprises an elongated member extending transversely of said belt and having sliding contact with said belt, said elongated member being shifted in opposite directions as the belt shifts between slack and taut conditions.

9. A retractor in accordance with claim 6 in which said means operable upon further belt protraction comprises a cam means frictionally coupled to said reel and in which said detent member comprises a portion operable by said cam means, said detent member being pivotally mounted for turning movement by said portion to shift said detent member to the release position to allow belt winding rotation.

10. A locking retractor for a seat belt comprising: a rotatable reel having a seat belt would thereon, means for locking said rotatable reel against further belt protraction at the time of an accident, a spring means biasing the reel in a winding direction, a toothed detent wheel connected to said reel for rotation therewith, a detent member movable into locking engagement with one of said teeth on said detent wheel to block belt winding rotation and movable to a release position from said teeth for allowing belt winding rotation, means for engaging the seat belt and being shifted thereby for shifting said detent member to its release position during belt protraction, and cam means operable upon further belt protraction after said initial belt protraction to hold said detent means in its release position momentarily to allow the belt reel to rewind the belt to take up the slack therein and to return said detent member to the same tooth previously engaged thereby preventing the accumulation of additional slack in the protracted belt.

11. In a locking retractor for a seat belt wound upon a rotatable reel urged by a biasing means to wind the belt onto the reel and having a selectively operable locking means for locking the reel against turning for belt protraction, the improvement of a tension relieving mechanism comprising:

means for blocking the reel against rewinding the protracted belt after initial protraction, a belt sensor means for sensing the tension of the belt and for operating said means for blocking the reel to a release position allowing full rewind of the belt unto the reel, said blocking means comprising a detent member and a ratchet wheel, a cam means for positioning said detent member in blocking engagement with said ratchet wheel and a non-blocking position with said ratchet wheel, said belt sensor means also operating said detent member between said blocking and non-blocking positions with said ratchet wheel.

12. In a locking retractor for a seat belt wound upon a rotatable reel urged by a biasing means to wind the belt onto the reel and having a selectively operable locking means for locking the reel against turning for belt protraction, the improvement of a tension relieving mechanism which locks the reel against belt winding after initial belt protraction and a slight rewind of the belt and allows a limited protraction thereafter without release of the tension relieving mechanism and which releases the tension relieving mechanism with a longer protraction than said limited protraction, said tension relieving mechanism comprising:

a ratchet wheel having at least one tooth thereon and connected to said reel, a detent spring wire having a first portion movable into locking engagement with one of said teeth on said ratchet wheel to block belt winding rotation and movable to a release position spaced from said tooth for allowing belt winding rotation, an actuating means engageable by said belt for actuating said detent spring wire when said belt is protracted, a second portion on said spring wire, a cam means driven by said reel and cooperating with said second portion of said spring wire to shift said first portion of said detent spring wire between its locking engagement and release positions with respect to said teeth on said ratchet teeth.

* * * * *

UNITED STATES PATENT AND TRADEMARK OFFICE
CERTIFICATE OF CORRECTION

PATENT NO. : 4,124,175
DATED : November 7, 1978
INVENTOR(S) : Raymond S. Cislak

It is certified that error appears in the above-identified patent and that said Letters Patent are hereby corrected as shown below:

Column 2, line 66, "objec" should read --object--.
Column 3, line 45, "whichis" should read --which is--.
Column 3, line 45, "side frame 23 and 24" should read --side frames 23 and 24--.
Column 7, line 5, "hen" should read --When--.
Column 9, line 20, "operats" should read --operates--.

Column 10, line 12, "for operation said means ot" should read --for operating said means to--.

Signed and Sealed this

Twenty-sixth Day of June 1979

[SEAL]

Attest:

RUTH C. MASON
Attesting Officer

DONALD W. BANNER
Commissioner of Patents and Trademarks